United States Patent [19]

Kimura et al.

[11] Patent Number: 4,722,920
[45] Date of Patent: Feb. 2, 1988

[54] ALUMINA CATALYST SUPPORTS

[75] Inventors: Mareo Kimura; Masakuni Ozawa; Akio Isogai, all of Aichi, Japan

[73] Assignee: Kabushiki Kaisha Toyota Chuo Kenyusho, Japan

[21] Appl. No.: 10,533

[22] Filed: Feb. 3, 1987

[30] Foreign Application Priority Data

Feb. 3, 1986 [JP] Japan ................................ 61-21688

[51] Int. Cl.$^4$ ........................ B01J 21/04; B01J 23/10; B01J 32/00
[52] U.S. Cl. ..................................... 502/439; 502/303
[58] Field of Search ................................ 502/303, 439

[56] References Cited

U.S. PATENT DOCUMENTS

| 4,021,185 | 5/1977 | Hindin et al. | 431/7 |
| 4,528,279 | 7/1985 | Suzuki et al. | 502/303 X |
| 4,624,940 | 11/1986 | Wan et al. | 502/303 X |

Primary Examiner—W. J. Shine
Attorney, Agent, or Firm—Berman, Aisenberg & Platt

[57] ABSTRACT

An alumina catalyst support stable at high temperatures comprises transformative alumina having a purity not less than 99.95% impregnated with lanthanum in an amount of 1.5 to 6 wt % based on the weight of the alumina. The alumina catalyst support has a surface area of at least 60 m$^2$/g after heating at 1200° C. for 5 hours.

7 Claims, 2 Drawing Figures

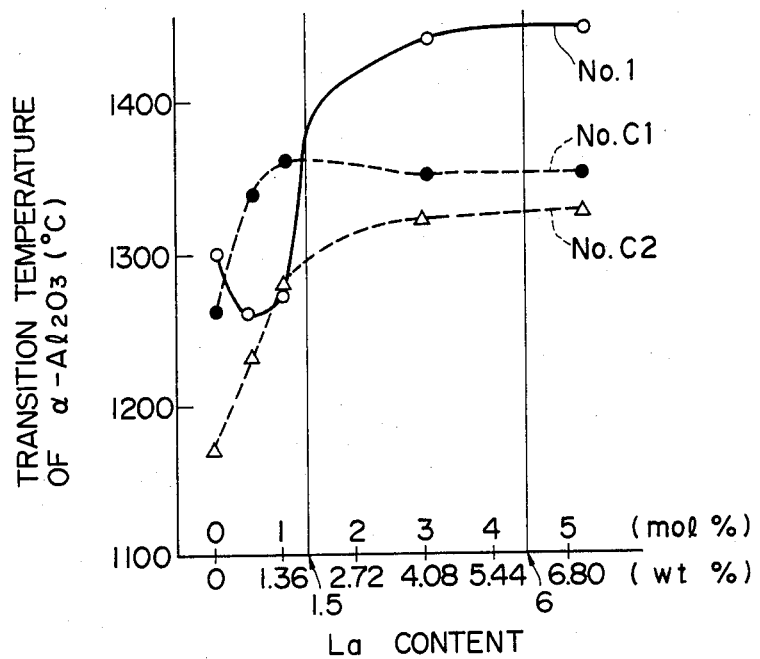
F I G. 1
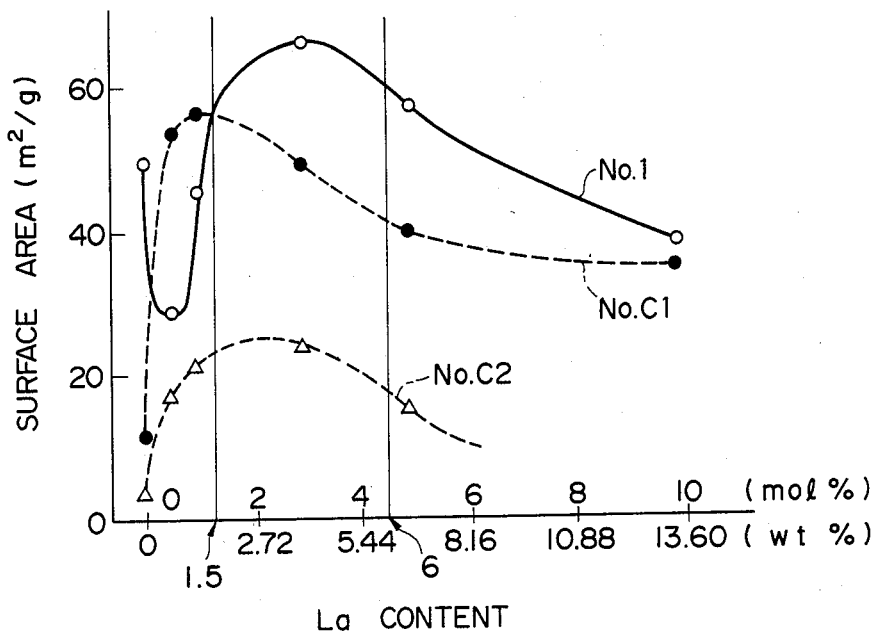
F I G. 2

ALUMINA CATALYST SUPPORTS

BACKGROUND OF THE INVENTION

1. Field of the Invention

The present invention relates to a support for the automotive exhaust gas purification catalyst or the combustion catalyst.

2. Description of the Prior Art

The prevailing catalyst for the treatment of combustion gas and automotive exhaust gas includes transition metals, transition metal oxides, and noble metals each supported on a proper support. The catalyst support is required to be able to support the expensive catalyst components in the highly dispersed state for their effective use. For this reason, the catalyst support is required to have a large surface area and to be stable at high temperatures for a long time.

One of the inexpensive catalyst supports to meet these requirements is transformative alumina having a large surface area. The well-known disadvantage of transformative alumina is that it transforms to $\alpha$-alumina upon heating at high temperatures above 1000° C., resulting in a substantial decrease in surface area. In the case where the transformative alumina is used as a catalyst support in the form of pellets or coating on molded products, the transformation to $\alpha$-alumina and the structure change resulting therefrom cause the coating layer to fall and promote the sintering of the catalyst component. It is known that transformative alumina can be heat-stabilized for the prevention of surface area decrease by the addition of an alkaline earth element or rare earth element. (Japanese Patent Laid-open Nos. 117387/1979 and 14600/1973 and U.S. Pat. No. 4,021,185)

The incorporation of an alkaline earth element or rare earth element alone is not enough to impart sufficient heat resistance to alumina which is used as a support of the combustion catalyst (for a gas turbine or automobile) which is exposed to high temperatures above 1000° C. The most heat resistant support developed so far is one which is incorporated with lanthanum as a rare earth element. It retains its surface area of 20 m²/g after heating at 1200° C. for 4 hours, but this is not enough. The present invention was completed to solve the above-mentioned problems involved in the prior art technology.

SUMMARY OF THE INVENTION

Accordingly, it is an object of the present invention to provide a heat-resistant alumina support which retains a sufficient surface area even after heating at high temperatures above 1000° C.

The gist of the invention resides in an alumina catalyst support stable at high temperatures which comprises transformative alumina having a purity not less than 99.95% impregnated with lanthanum in an amount of 1.5 to 6 wt% based on the weight of the alumina, said alumina catalyst support having a surface area of at least 60 m²/g after heating at 1200° C. for 5 hours.

BRIEF DESCRIPTION OF THE DRAWINGS

FIG. 1 is a graph showing the relationship between the content of lanthanum in alumina and the temperature at which the alumina transforms to $\alpha$-alumina.

FIG. 2 is a graph showing the relationship between the content of lanthanum in alumina and the specific surface area of alumina measured after heating.

DETAILED DESCRIPTION OF THE INVENTION

According to the present invention, the transformative alumina should have a purity not less than 99.95% because as the purity increases the transformation to $\alpha$-alumina at high temperatures above 1000° C. is suppressed and the lanthanum produces a marked effect, providing a large surface area. With a purity lower than 99.95%, the above-mentioned effect cannot be obtained. The best result is achieved when the purity is not less than 99.99%.

There are several kinds of transformative alumina, such as $\gamma$-alumina (gamma alumina), $\delta$-alumina (delta alumina), $\eta$-alumina (eta alumina), $\chi$-alumina (chi alumina), $\theta$-alumina (theta alumina), and $\kappa$-alumina (kappa alumina). They may be used individually or in combination with one another. Most desirable among them is $\delta$-alumina. The transformative alumina should preferably be fine powder with particle size not more than 0.5 $\mu$m.

The transformative alumina may be commercial one or may be prepared by coprecipitation from a solution of water-soluble aluminum compounds, such as aluminum nitrate, aluminum halide, and aluminum sulfate.

Lanthanum is an impregnant for the above-mentioned transformative alumina. It prevents the transformative alumina from transforming to $\alpha$-alumina at high temperatures, with a decrease in surface area. This effect is enhanced when the transformative alumina has a purity not less than 99.95%. It should be noted that the above-mentioned effect is not produced when lanthanum is merely added to the transformative alumina.

The transformative alumina should be impregnated with lanthanum in an amount of 1.5 to 6 wt% based on the weight of the alumina. With an amount less than 1.5 wt%, the lanthanum functions as an impurity and decreases the surface area. With an amount more than 6 wt%, excess lanthanum not adsorbed by the alumina reacts with the alumina to form complex oxides, such as $LaAlO_3$ and $La_2Al_{24.4}O_{39.6}$ which causes the crystal growth and decreases the surface area. The best result is obtained when the amount of lanthanum is 2.5 to 4.0 wt%.

The support according to the present invention retains a surface area of at least 60 m²/g after heating at 1200° C. for 5 hours. This heating condition is used to determine the characteristic properties of the support of the invention.

The support of the invention can be produced by the impregnation method. For example, transformative alumina is immersed with stirring in an aqueous solution containing lanthanum in the form of lanthanum nitrate or the like. The pickup of water is usually 50 to 70%. The impregnated alumina is dried and calcined. For the uniform adsorption of lanthanum, the calcination should be carried out at a temperature below the transformation temperature of alumina, preferably below 600° C., for about 10 hours in the air.

The support of the invention may take the shape of granules, pellets, or a honeycomb. The support may also be produced by covering molded products of porous ceramics with the transformative alumina impregnated with lanthanum.

The support of the invention will find use as a support for the automotive exhaust gas purification catalyst and combustion catalyst. Owing to its good heat resistance, it will be advantageously used as a support for catalysts to be used at high temperatures above 1000° C. In addition, owing to lanthanum contained therein and its high purity, the support retains the initial form of transformative alumina with a minimum decrease of surface area.

The invention is now described with reference to the following examples.

EXAMPLE 1

Commercial transformative alumina (δ-alumina) having a purity not less than 99.99% was impregnated with an aqueous solution of lanthanum nitrate ($La(NO_3)_3 \cdot 6H_2O$). The ratio of lanthanum to alumina was 0, 0.5, 1.0, 3.0, 5.0 and 10.0 mol%. The impregnation was carried out by immersing the alumina with stirring in the aqueous solution until the water absorption reached about 50 to 70%. The impregnated alumina was dried and then calcined at 600° C. for 10 hours in the air. Thus there was obtained support No. 1.

For the purpose of comparison, the same experiment as above was carried out with commercial transformative alumina having a purity of 99.9%. The resulting product was designated as support No. C1. Moreover, the same experiment as above was carried out with commercial transformative alumina having a purity of 99%. The resulting product was designated as support No. C2.

The supports of different kinds obtained as mentioned above were heated at 1200° C. for 5 hours to test their heat resistance. After heating the specific surface area was measured by BET method, the temperature at which the alumina begins to transform to α-alumina was measured by DTA, and the change of structure was observed by XRD. The specific surface area is shown in FIG. 2; the transform temperature is shown in FIG. 1; and the change of structure is shown in Table 1.

TABLE 1

| Sample | Amount of lanthanum impregnated (mol %) | | | | |
|---|---|---|---|---|---|
| | 0 | 1 | 3 | 5 | 10 |
| No. 1 | δ>>>α | δ>>α | δ | δ>>P>β | δ>>P>β |
| No. C1 | α | θ | θ>>β | θ>β≈P | θ>P≧β |
| No. C2 | α | θ>α>>P | θ>>P,α,β | — | |

Note:
P represents the structure of $LaAlO_3$, and β represents the structure of $La \cdot \beta \text{-} Al_2O_3 (La_2Al_{24.4}O_{39.6})$.

It is apparently noted from FIGS. 1 and 2 and Table 1 that the transformative alumina having the specified purity and containing the specified amount of lanthanum retains its initial form (δ-alumina) and a surface area not less than 60 m²/g.

EXAMPLE 2

The support No. 1 impregnated with 3.0 mol% of lanthanum in Example 1 was heated at 1200° C. for 5, 10, and 15 hours in the air to test the heat resistance. The specific surface area measured after heating is shown in Table 2. It is apparently noted from Table 2 that the support of the invention retains its surface area after heating and has good heat resistance.

TABLE 2

| | Heating time (hr) | | |
|---|---|---|---|
| | 5 | 10 | 15 |
| Specific surface area (m²/g) | 66 | 61 | 60 |

What is claimed is:

1. An alumina catalyst support stable at high temperatures which comprises transformative alumina having a purity of not less than 99.95% impregnated with lanthanum in an amount of 1.5 to 6 wt% based on the weight of the alumina, said alumina catalyst support having a surface area of at least 60 m²/g after heating at 1200° C. for 5 hours.

2. An alumina catalyst support according to claim 1, wherein said transformative alumina has a purity not less than 99.99%.

3. An alumina catalyst support according to claim 1, wherein said transformative alumina is at least one alumina selected from the group consisting of gamma-alumina, delta-alumina, eta-alumina, chi-alumina, theta-alumina and kappa-alumina.

4. An alumina catalyst support according to claim 1, wherein said transformative alumina has a particle size not more than 0.5 μm.

5. An alumina catalyst support according to claim 1, wherein said transformative alumina is impregnated with said lanthanum in an amount of 2.5 to 4.0 wt% based on the weight of the alumina.

6. An alumina catalyst support according to claim 1, wherein said support is in form of granules, pellets or a honeycomb.

7. A process for preparing an aluminum catalyst support having a surface area of at least 60 m²/g after heating at 1200° C. for five hours, which comprises impregnating transformative alumina, having a purity of not less than 99.95%, with from 1.5 to 6 wt%, based on the weight of the alumina, of lanthanum.

* * * * *